United States Patent
Ray

(10) Patent No.: US 11,997,117 B2
(45) Date of Patent: *May 28, 2024

(54) INTRUSION DETECTION USING A HEARTBEAT

(71) Applicant: Sophos Limited, Abingdon (GB)

(72) Inventor: Kenneth D. Ray, Seattle, WA (US)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,830

(22) Filed: Mar. 7, 2023

(65) Prior Publication Data
US 2023/0216883 A1    Jul. 6, 2023

Related U.S. Application Data

(63) Continuation of application No. 17/687,884, filed on Mar. 7, 2022, now Pat. No. 11,621,968, which is a continuation of application No. 16/872,950, filed on May 12, 2020, now Pat. No. 11,303,654, which is a continuation of application No. 15/903,924, filed on Feb. 23, 2018, now Pat. No. 10,673,873, which is a continuation of application No. 14/263,966, filed on Apr. 28, 2014, now Pat. No. 9,917,851.

(51) Int. Cl.
*H04L 9/40* (2022.01)

(52) U.S. Cl.
CPC ...... *H04L 63/1416* (2013.01); *H04L 63/0227* (2013.01); *H04L 63/0236* (2013.01); *H04L 63/1425* (2013.01); *H04L 63/145* (2013.01); *H04L 63/20* (2013.01)

(58) Field of Classification Search
CPC ............... H04L 63/145; H04L 63/0236; H04L 63/1425

See application file for complete search history.

(56) References Cited

U.S. PATENT DOCUMENTS

| | | | |
|---|---|---|---|
| 6,131,120 | A | 10/2000 | Reid |
| 6,321,338 | B1 | 11/2001 | Porras et al. |
| 7,028,179 | B2 | 4/2006 | Anderson et al. |
| 7,174,566 | B2 | 2/2007 | Yadav |

(Continued)

FOREIGN PATENT DOCUMENTS

WO    WO2016097757    6/2016

OTHER PUBLICATIONS

Yen, Ting-Fang et al., "Beehive—Largescale log analysis for detecting suspicious activity in enterprise networks", ACM, vol. 13 Dec. 2013, 10 pages.

(Continued)

*Primary Examiner* — Viral S Lakhia
(74) *Attorney, Agent, or Firm* — Strategic Patents, P.C.

(57) ABSTRACT

Possible Denial of Service (DoS) activity is detected and remediated based on an initial heartbeat failure from a network asset, followed by externally directed network traffic from the network asset. In general, an interruption of the heartbeat can signal the possible presence of malware on the network asset, and the externally directed network traffic, and particularly certain patterns of traffic such as a high volume of traffic toward an address with a known, good reputation, can signal the possible presence of a DoS bot on the network asset that is sourcing the network traffic.

20 Claims, 5 Drawing Sheets

(56) References Cited

U.S. PATENT DOCUMENTS

| | | | |
|---|---|---|---|
| 7,339,887 B2 * | 3/2008 | Griswold | H04L 12/4637 370/216 |
| 7,340,597 B1 | 3/2008 | Cheriton | |
| 7,383,462 B2 | 6/2008 | Osaki et al. | |
| 7,424,736 B2 | 9/2008 | Cook et al. | |
| 7,472,422 B1 | 12/2008 | Agbabian et al. | |
| 7,478,424 B2 * | 1/2009 | Mester | H04L 51/212 713/153 |
| 7,599,301 B2 | 10/2009 | Matityahu et al. | |
| 7,620,974 B2 | 11/2009 | Newstadt et al. | |
| 7,634,230 B2 | 12/2009 | Ji et al. | |
| 7,647,422 B2 | 1/2010 | Singh et al. | |
| 7,669,242 B2 * | 2/2010 | Sahita | G06F 21/554 726/22 |
| 7,814,554 B1 | 10/2010 | Ragner | |
| 7,890,637 B1 * | 2/2011 | Zhang | H04L 63/0236 709/227 |
| 7,917,948 B2 | 3/2011 | Kalimuthu et al. | |
| 7,926,108 B2 | 4/2011 | Rand et al. | |
| 7,979,368 B2 | 7/2011 | Kapoor et al. | |
| 8,020,207 B2 | 9/2011 | Chow et al. | |
| 8,042,147 B2 | 10/2011 | Byres et al. | |
| 8,090,852 B2 | 1/2012 | Tanchici et al. | |
| 8,181,244 B2 | 5/2012 | Boney | |
| 8,201,243 B2 | 6/2012 | Boney | |
| 8,271,724 B1 | 9/2012 | Scott et al. | |
| 8,272,061 B1 | 9/2012 | Lotem et al. | |
| 8,286,255 B2 | 10/2012 | Grant et al. | |
| 8,353,058 B1 | 1/2013 | McCorkendale et al. | |
| 8,356,092 B2 | 1/2013 | Rasanen | |
| 8,392,972 B2 | 3/2013 | Manring et al. | |
| 8,413,209 B2 * | 4/2013 | Aldera | H04W 12/08 713/185 |
| 8,413,238 B1 | 4/2013 | Sutton et al. | |
| 8,417,954 B1 | 4/2013 | Sagal et al. | |
| 8,418,250 B2 | 4/2013 | Morris et al. | |
| 8,462,212 B1 | 6/2013 | Kundu et al. | |
| 8,479,267 B2 * | 7/2013 | Donley | H04L 63/1416 713/168 |
| 8,510,829 B2 | 8/2013 | Mohandas et al. | |
| 8,531,986 B2 | 9/2013 | Raleigh | |
| 8,544,081 B2 | 9/2013 | Kallath et al. | |
| 8,561,167 B2 | 10/2013 | Alperovitch et al. | |
| 8,621,460 B2 | 12/2013 | Evans | |
| 8,655,307 B1 | 2/2014 | Mandal et al. | |
| 8,671,449 B1 | 3/2014 | Nachenberg et al. | |
| 8,677,473 B2 | 3/2014 | Dennerline et al. | |
| 8,700,899 B1 | 4/2014 | Juels | |
| 8,706,834 B2 | 4/2014 | Sorenson | |
| 8,719,932 B2 | 5/2014 | Boney | |
| 8,726,389 B2 | 5/2014 | Morris et al. | |
| 8,763,084 B2 * | 6/2014 | Mower | H04L 67/025 726/3 |
| 8,763,123 B2 | 6/2014 | Morris et al. | |
| 8,776,104 B2 | 7/2014 | Sugiyama | |
| 8,806,630 B2 | 8/2014 | Qiu et al. | |
| 8,819,772 B2 | 8/2014 | Bettini et al. | |
| 8,832,832 B1 | 9/2014 | Visbal | |
| 8,856,505 B2 | 10/2014 | Schneider | |
| 8,909,202 B2 | 12/2014 | Luna | |
| 8,914,406 B1 | 12/2014 | Hahn et al. | |
| 8,918,881 B2 | 12/2014 | Bettini et al. | |
| 8,984,636 B2 | 3/2015 | Brennan | |
| 8,994,556 B2 | 3/2015 | Lundy | |
| 9,047,441 B2 | 6/2015 | Xie et al. | |
| 9,055,090 B2 | 6/2015 | Delatorre et al. | |
| 9,060,017 B2 | 6/2015 | Marion et al. | |
| 9,098,706 B1 | 8/2015 | Kennedy | |
| 9,124,636 B1 | 9/2015 | Rathor | |
| 9,143,519 B2 | 9/2015 | Teddy et al. | |
| 9,167,000 B2 | 10/2015 | Mackin | |
| 9,177,145 B2 | 11/2015 | Todorovic | |
| 9,178,715 B2 | 11/2015 | Jain et al. | |
| 9,191,365 B2 | 11/2015 | Orr et al. | |
| 9,191,399 B2 | 11/2015 | Davis et al. | |
| 9,210,183 B2 | 12/2015 | Sadovsky et al. | |
| 9,235,706 B2 | 1/2016 | Ramabhatta et al. | |
| 9,270,636 B2 | 2/2016 | Narasimhamurthy et al. | |
| 9,270,639 B2 * | 2/2016 | Lopez | H04L 63/0218 |
| 9,270,698 B2 | 2/2016 | Gopal et al. | |
| 9,282,040 B2 | 3/2016 | Wing et al. | |
| 9,374,374 B2 | 6/2016 | Steinberg et al. | |
| 9,392,015 B2 | 7/2016 | Thomas et al. | |
| 9,413,721 B2 | 8/2016 | Morris et al. | |
| 9,430,646 B1 | 8/2016 | Rosenberry et al. | |
| 9,578,045 B2 | 2/2017 | Jaroch et al. | |
| 9,578,052 B2 | 2/2017 | Cp et al. | |
| 9,614,865 B2 | 4/2017 | Teddy et al. | |
| 9,716,617 B1 | 7/2017 | Ahuja et al. | |
| 9,736,693 B2 | 8/2017 | Eyal | |
| 9,781,019 B1 | 10/2017 | Cooley | |
| 9,928,366 B2 | 3/2018 | Ladnai et al. | |
| 10,257,224 B2 | 4/2019 | Jaroch et al. | |
| 10,262,136 B1 | 4/2019 | Kailash et al. | |
| 10,742,601 B2 | 8/2020 | Xie et al. | |
| 2002/0186683 A1 | 12/2002 | Buck et al. | |
| 2004/0049693 A1 | 3/2004 | Douglas et al. | |
| 2006/0077940 A1 | 4/2006 | Ganji et al. | |
| 2007/0167194 A1 | 7/2007 | Brown et al. | |
| 2007/0180077 A1 | 8/2007 | Letca et al. | |
| 2007/0180081 A1 | 8/2007 | Okmianski et al. | |
| 2007/0199061 A1 | 8/2007 | Byres et al. | |
| 2007/0204341 A1 | 8/2007 | Rand et al. | |
| 2007/0261112 A1 | 11/2007 | Todd et al. | |
| 2008/0175226 A1 | 7/2008 | Alperovitch et al. | |
| 2008/0310337 A1 | 12/2008 | Welles et al. | |
| 2009/0064334 A1 | 3/2009 | Holcomb et al. | |
| 2009/0172114 A1 | 7/2009 | Srikanth et al. | |
| 2009/0247125 A1 | 10/2009 | Grant et al. | |
| 2009/0320138 A1 | 12/2009 | Keanini et al. | |
| 2010/0050244 A1 | 2/2010 | Tarkhanyan et al. | |
| 2010/0125900 A1 | 5/2010 | Dennerline et al. | |
| 2010/0150170 A1 | 6/2010 | Lee et al. | |
| 2010/0212010 A1 | 8/2010 | Stringer et al. | |
| 2011/0055891 A1 | 3/2011 | Rice et al. | |
| 2011/0238855 A1 | 9/2011 | Korsunsky et al. | |
| 2011/0296519 A1 | 12/2011 | Ide et al. | |
| 2011/0310899 A1 | 12/2011 | Alkhatib et al. | |
| 2012/0030731 A1 | 2/2012 | Bhargava et al. | |
| 2012/0030750 A1 | 2/2012 | Bhargava et al. | |
| 2012/0066346 A1 | 3/2012 | Virmani et al. | |
| 2012/0066762 A1 | 3/2012 | Todorovic et al. | |
| 2012/0072725 A1 | 3/2012 | Fanton et al. | |
| 2012/0174219 A1 | 7/2012 | Hernandez et al. | |
| 2012/0188072 A1 | 7/2012 | Dawes | |
| 2012/0240185 A1 | 9/2012 | Kapoor et al. | |
| 2012/0324222 A1 | 12/2012 | Massey et al. | |
| 2013/0031600 A1 | 1/2013 | Luna et al. | |
| 2013/0031632 A1 | 1/2013 | Thomas et al. | |
| 2013/0117852 A1 | 5/2013 | Stute et al. | |
| 2013/0145472 A1 | 6/2013 | Ramabhatta et al. | |
| 2013/0232576 A1 | 9/2013 | Karnikis et al. | |
| 2013/0254833 A1 | 9/2013 | Nicodemus et al. | |
| 2013/0268994 A1 | 10/2013 | Cooper et al. | |
| 2013/0311617 A1 * | 11/2013 | Takahashi | H04L 43/10 709/219 |
| 2013/0328697 A1 * | 12/2013 | Lundy | G08C 17/02 340/870.01 |
| 2014/0013434 A1 | 1/2014 | Ranum et al. | |
| 2014/0020067 A1 | 1/2014 | Kim et al. | |
| 2014/0075567 A1 * | 3/2014 | Raleigh | H04W 4/24 726/26 |
| 2014/0140213 A1 | 5/2014 | Raleigh | |
| 2014/0208426 A1 | 7/2014 | Natarajan et al. | |
| 2014/0283065 A1 | 9/2014 | Teddy et al. | |
| 2014/0283066 A1 | 9/2014 | Teddy et al. | |
| 2014/0289853 A1 | 9/2014 | Teddy et al. | |
| 2015/0047032 A1 | 2/2015 | Hannis et al. | |
| 2015/0058624 A1 | 2/2015 | Borisov et al. | |
| 2015/0096024 A1 | 4/2015 | Haq et al. | |
| 2015/0121449 A1 | 4/2015 | Cp et al. | |
| 2015/0172300 A1 | 6/2015 | Cochenour | |
| 2015/0201016 A1 | 7/2015 | Golander et al. | |

(56) References Cited

U.S. PATENT DOCUMENTS

| | | |
|---|---|---|
| 2015/0207809 A1 | 7/2015 | Macaulay |
| 2015/0234846 A1 | 8/2015 | Moore |
| 2015/0312266 A1 | 10/2015 | Thomas |
| 2015/0312267 A1 | 10/2015 | Thomas |
| 2015/0312268 A1 | 10/2015 | Ray |
| 2017/0004303 A1 | 1/2017 | Yan |
| 2017/0339172 A1 | 11/2017 | Mahadevia et al. |
| 2018/0191752 A1 | 7/2018 | Ray |
| 2019/0306181 A1 | 10/2019 | Mahadevia et al. |
| 2020/0274891 A1 | 8/2020 | Ray |
| 2020/0280567 A1 | 9/2020 | Thomas |
| 2021/0250367 A1 | 8/2021 | Mahadevia et al. |
| 2022/0191225 A1 | 6/2022 | Ray |
| 2022/0368698 A1 | 11/2022 | Thomas |
| 2023/0208860 A1 | 6/2023 | Mahadevia et al. |

OTHER PUBLICATIONS

Yasm, Curt, "Prelude as a Hybrid IDS Framework", Retrieved from the Internet: URL:https://www.sans.org/reading-room/whitepapers/awareness/prelude-hybrid-ids-framework-33048 [retrieved on Feb. 22, 2016] sections 3-5 and 7. Jan. 1, 2009, 46 pages.
USPTO, "U.S. Appl. No. 14/263,966 Notice of Allowance dated Jan. 11, 2018", 8 pages.
USPTO, "U.S. Appl. No. 14/263,977 Notice of Allowance dated Jun. 19, 2018", 13 pages.
USPTO, "U.S. Appl. No. 15/527,783 Notice of Allowance dated Apr. 10, 2019", 13 pages.
USPTO, "U.S. Appl. No. 15/527,783 Notice of Allowance dated Jul. 8, 2019", 9 pages.
USPTO, "U.S. Appl. No. 15/527,783 Notice of Allowance dated Aug. 20, 2019", 8 pages.
USPTO, "U.S. Appl. No. 15/527,783 Notice of Allowance dated Dec. 18, 2019", 10 pages.
USPTO, "U.S. Appl. No. 15/903,924 Final Office Action dated Jun. 26, 2019", 21 pages.
USPTO, "U.S. Appl. No. 15/903,924 Non-Final Office Action dated Nov. 23, 2018", 18 pages.
USPTO, "U.S. Appl. No. 15/903,924 Notice of Allowance dated Jan. 31, 2020", 13 pages.
USPTO, "U.S. Appl. No. 16/137,218 Non-Final Office Action dated Jun. 27, 2019", 24 pages.
USPTO, "U.S. Appl. No. 16/137,218 Notice of Allowance dated Nov. 29, 2019", 8 pages.
USPTO, "U.S. Appl. No. 16/445,067 Notice of Allowance dated Dec. 24, 2020", 9 pages.
USPTO, "U.S. Appl. No. 16/811,397 Non-Final Office Action dated Aug. 16, 2021", 23 pages.
USPTO, "U.S. Appl. No. 16/811,397 Notice of Allowance dated Feb. 8, 2022", 14 pages.
USPTO, "U.S. Appl. No. 16/872,950 Notice of Allowance dated Dec. 10, 2021", 18 pages.
USPTO, "U.S. Appl. No. 17/215,294 Notice of Allowance dated Aug. 4, 2022", 11 pages.
USPTO, "U.S. Appl. No. 17/215,294 Notice of Allowance dated Nov. 16, 2022", 8 pages.
USPTO, "U.S. Appl. No. 17/687,884 Notice of Allowance dated Nov. 3, 2022", 15 pages.
USPTO, "U.S. Appl. No. 17/687,884 Notice of Allowance dated Dec. 9, 2022", 8 pages.
USPTO, "U.S. Appl. No. 17/721,614 Non-Final Office Action dated Dec. 22, 2022", 17 pages.
USPTO, "U.S. Appl. No. 14/263,955, Non-Final Office Action dated Aug. 28, 2015", 15 pages.
USPTO, "U.S. Appl. No. 14/263,955, Notice of Allowance dated May 18, 2016", 8 pages.
USPTO, "U.S. Appl. No. 14/263,966, Non-Final Office Action dated Apr. 28, 2016", 17 pages.
USPTO, "U.S. Appl. No. 14/263,966, Non-Final Office Action dated Jul. 30, 2015", 14 pages.
USPTO, "U.S. Appl. No. 14/263,966, Final Office Action dated Dec. 7, 2016", 20 pages.
USPTO, "U.S. Appl. No. 14/263,966, Non-Final Office Action dated Jun. 8, 2017", 19 pages.
USPTO, "U.S. Appl. No. 14/263,977, Non-Final Office Action dated Sep. 1, 2015", 18 pages.
USPTO, "U.S. Appl. No. 14/263,977, Final Office Action dated Apr. 22, 2016", 18 pages.
USPTO, "U.S. Appl. No. 14/263,977, Non-Final Office Action dated Dec. 7, 2016", 17 pages.
USPTO, "U.S. Appl. No. 14/263,977, Final Office Action dated Aug. 18, 2017", 19 pages.
USPTO, "U.S. Appl. No. 15/206,988, Non-Final Office Action dated Jan. 5, 2017", 12 pages.
USPTO, "U.S. Appl. No. 15/206,988, Notice of Allowance dated Mar. 16, 2017", 8 pages.
IP India, "IN Application No. 202022002860 Examination Report dated Aug. 23, 2021", 6 pages.
IP India, "IN Application Serial No. 4068/MUM/2014 Examination Report dated Jul. 23, 2019", 6 pages.
WIPO, "PCT Application No. PCT/GB2015/054072 International Preliminary Report on Patentability dated Jun. 29, 2017", 10 pages.
EPO, "PCT Application No. PCT/GB2015/054072 International Search Report and Written Opinion dated Mar. 8, 2016", 15 pages.
IPO, "UK Application No. 1708089.6 Examination Report dated May 24, 2019", 5 pages.
USPTO, "U.S. Appl. No. 18/112,630 Notice of Allowance dated Sep. 27, 2023", 9 pages.

* cited by examiner

INTRUSION DETECTION USING A HEARTBEAT

CROSS-REFERENCE TO RELATED APPLICATIONS

This application is a continuation of U.S. patent application Ser. No. 17/687,884, filed Mar. 7, 2022, which is a continuation of U.S. patent application Ser. No. 16/872,950 (now U.S. Pat. No. 11,303,654), filed May 12, 2020, which is a continuation of U.S. patent application Ser. No. 15/903,924 (now U.S. Pat. No. 10,673,873), filed Feb. 23, 2018, which is a continuation of U.S. patent application Ser. No. 14/263,966 (now U.S. Pat. No. 9,917,851), filed Apr. 28, 2014, the entire contents of which are hereby incorporated herein by reference.

BACKGROUND

A variety of techniques exist for detecting and remediating malware in computer systems such as endpoints in an enterprise. However, advanced persistent threats employ stealthy, continuous hacking processes over extended periods orchestrated from a remote location using various exploits and a command and control infrastructure for orchestrating attacks from a remote location. There remains a need for improved detection and remediation of advanced persistent threats.

SUMMARY

Possible Denial of Service (DoS) activity is detected and remediated based on an initial heartbeat failure from a network asset, followed by externally directed network traffic from the network asset. In general, an interruption of the heartbeat can signal the possible presence of malware on the network asset, and the externally directed network traffic, and particularly certain patterns of traffic such as a high volume of traffic toward an address with a known, good reputation, can signal the possible presence of a DoS bot on the network asset that is sourcing the network traffic.

BRIEF DESCRIPTION OF THE FIGURES

The invention and the following detailed description of certain embodiments thereof may be understood by reference to the following figures. The drawings are not necessarily to scale, emphasis instead being placed upon illustrating the principles of the devices, systems, and methods described herein.

DETAILED DESCRIPTION

All documents mentioned herein are incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it will be understood that terms such as "first," "second," "above," "below," and the like, are words of convenience and are not to be construed as limiting terms.

While the techniques described herein emphasize the detection and remediation of advanced persistent threats that can be manually and remotely controlled through a command and control infrastructure, it will be appreciated that the foregoing systems and methods may also be applicable in a wide variety of threat management contexts including malware, viruses and the like that might not be classified as advanced persistent threats. Thus, references to advanced persistent threats throughout this document should be understood to also refer to any other malware or the like that might be usefully remediated using the techniques described herein. More generally, the scope of this disclosure is not limited by the context and examples provided below, but is intended to include any other adaptations or uses of the disclosed techniques that might be apparent to one of ordinary skill in the art.

Figure 1:
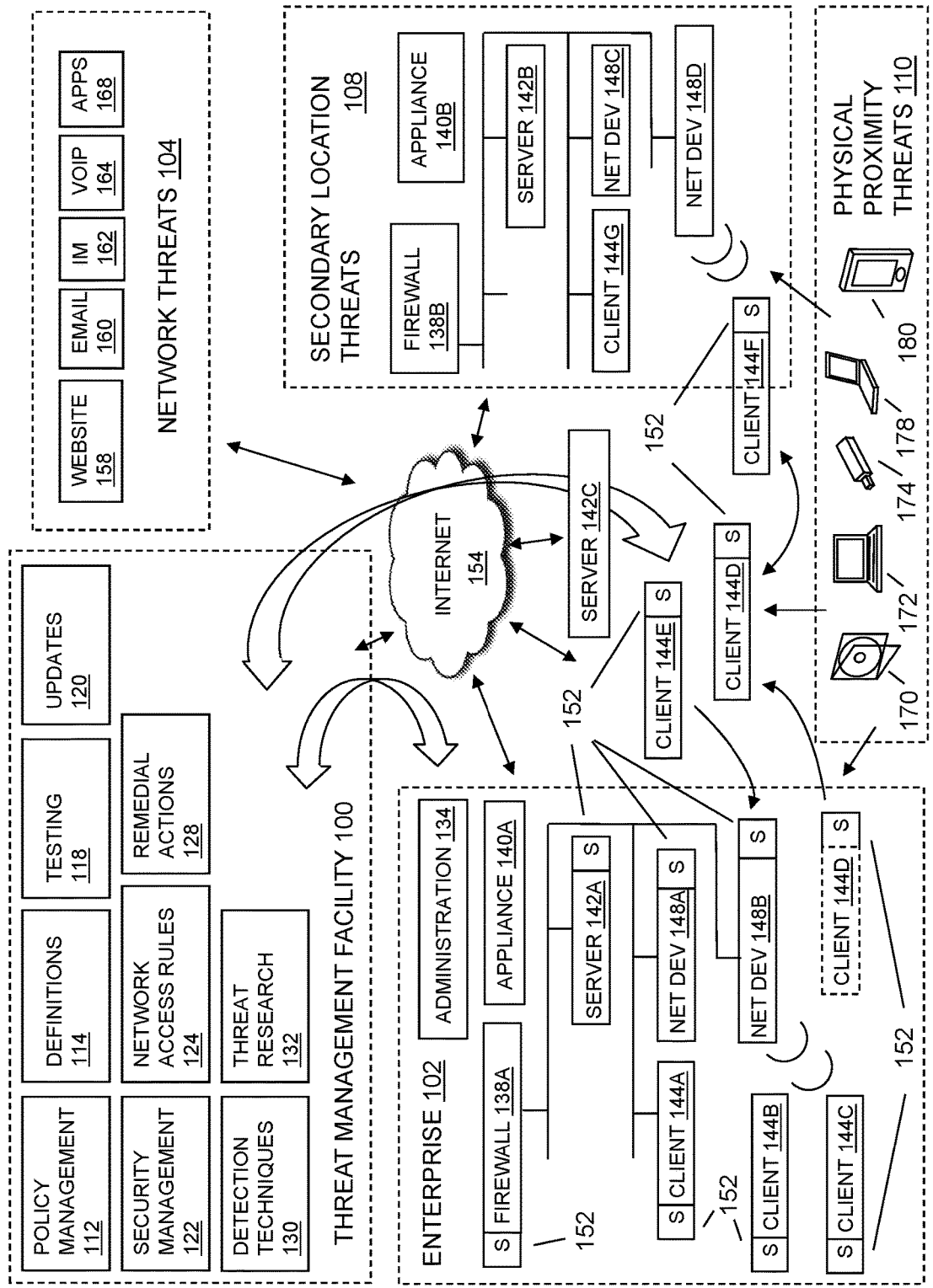
FIG. 1 illustrates an environment for threat management.

FIG. 1 illustrates an environment for threat management. Specifically, FIG. 1 depicts a block diagram of a threat management facility providing protection to an enterprise against a plurality of threats. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both technical and user perspectives, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include client facilities 144D that have moved into network connectivity not directly associated or controlled by the enterprise facility 102. Threats to client facilities 144 may come from a plurality of sources, such as from network threats 104, physical proximity threats 110, secondary location threats 108, and the like. Clients 144 may be protected from threats even when the client 144 is not located in association with the enterprise 102, such as when a client 144E-F moves in and out of the enterprise 102, for example when interfacing with an unprotected server 142C through the Internet 154, when a client 144F is moving into a secondary location threat 108 such as interfacing with components 136B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, scanning an application when the application is executed, scanning files as the files are transmitted to or from the client facility 144, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide a policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility 144 access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to instant messaging (IM) 162 in support of the enterprise facility 102. In an embodiment, the policy management facility 112 may be a stand-alone application, may be part of the network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g. as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, administration facility 134, firewall 138, gateway, hubs and routers 148, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like (such as a user's desktop computer as an end-point computer), a firewall as a data evaluation end-point computer system, a laptop as a mobile end-point computer, a PDA or tablet as a hand-held end-point computer, a mobile phone as an end-point computer, or the like. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an Internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PUP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148A or wireless network facilities 148B. Client facilities 144 connected to the enterprise facility 102 network via a wired facility 148A or wireless facility 148B may receive similar protection, as both connection types are ultimately connected to the same enterprise facility 102 network, with the same end-point computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility 144B-F, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144D-F that has an embedded end-point computer security facility 152, such as by providing URI filtering in personal routers, using a web appliance as a DNS proxy, or the like. Mobile client facilities 144D-F that are components of the enterprise facility 102 but temporarily outside connectivity with the enterprise facility 102 network, may be provided with the same threat protection and policy control as client facilities 144 inside the enterprise facility 102. In addition, mobile client facilities 144B-F may receive the same interactions to and from the threat management facility 100 as client facilities 144 inside the enterprise facility 102, where mobile client facilities 144B-F may be considered a virtual extension of the enterprise facility 102, receiving all the same services via their embedded end-point computer security facility 152.

Interactions between the threat management facility 100 and the components of the enterprise facility 102, including mobile client facility 144B-F extensions of the enterprise facility 102, may ultimately be connected through the Internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the Internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise client facility 144B-F equipped with an end-point computer security facility 152, but in embodiments, as long as the mobile client facility 144B-F is embedded with an end-point computer security facility 152, as described above, threats may have no better success than if the mobile client facility 144B-F were inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144F is in a secondary location 108 or connecting wirelessly to a non-enterprise facility 102 wireless Internet connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a set of specific techniques for detecting and remediating advanced persistent threats.

Figure 2:
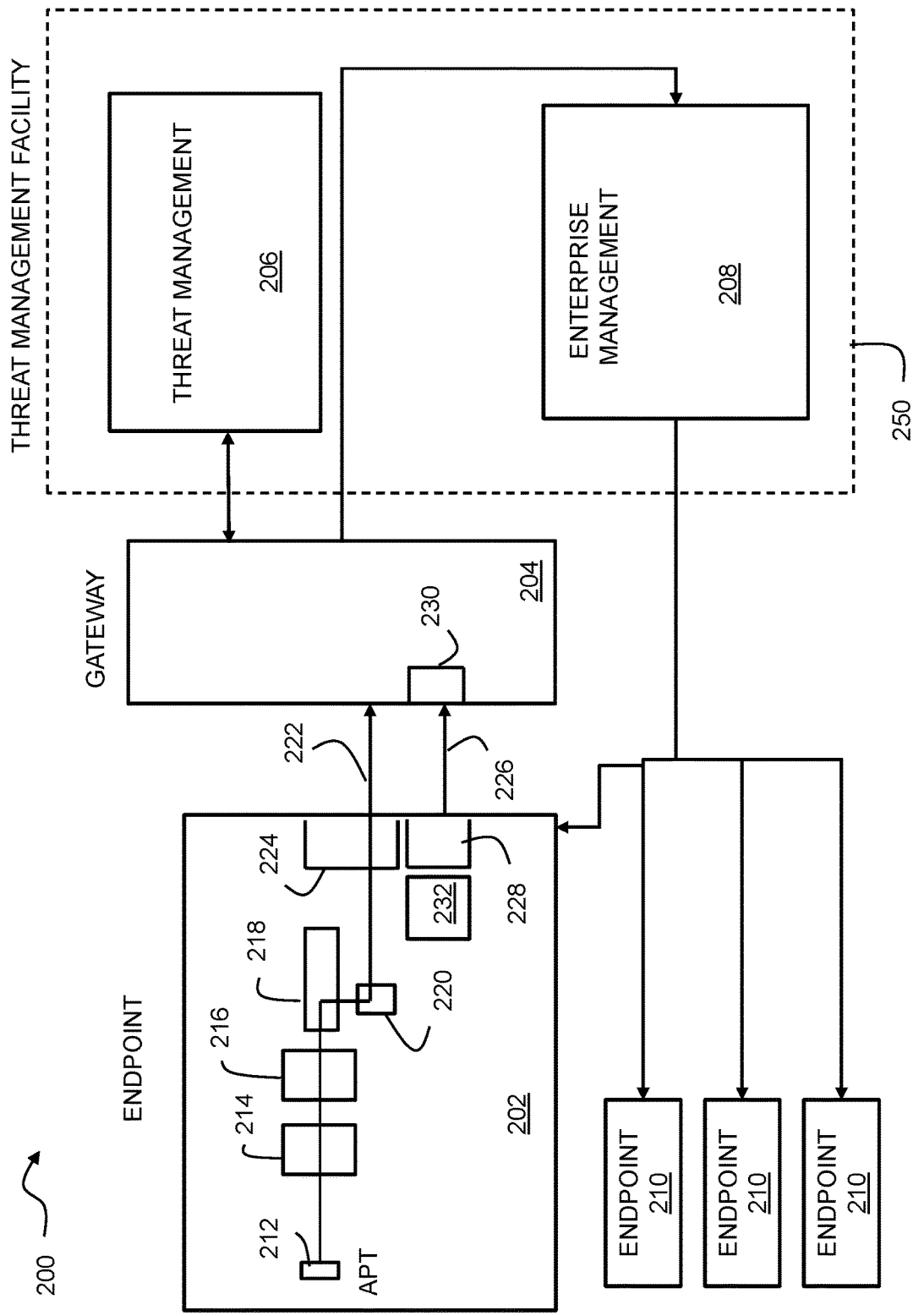
FIG. 2 shows entities involved in a threat management process.

FIG. 2 shows entities involved in a threat management process. In general, a system 200 may include an endpoint 202, a gateway 204, a threat management system 206, and an enterprise management system 208 that manages an enterprise including the endpoint 202, the gateway 204, and one or more additional endpoints 210. Each of these components may be configured with suitable programming to participated in the detection and remediation of an advanced persistent threat (APT) as contemplated herein.

The endpoint 202 may be any of the endpoints described herein, or any other device or network asset that might join or participate in an enterprise network. The endpoint 202 may contain an advanced persistent threat (APT) 212 or similar malware that resides on the endpoint 202. The APT 212 may have reached the endpoint 202 in a variety of ways, and may have been placed manually or automatically on the endpoint 202 by a malicious source. It will be understood that the APT 212 may take any number of forms and have any number of components. For example, the APT 212 may include an executable file that can execute independently, or the APT 212 may be a macro, plug-in, or the like that executes within another application. Similarly, the APT 212 may manifest as one or more processes or threads executing on the endpoint 202. Further, the APT 212 may install from a file on the endpoint 202 (or a file remote from the endpoint 202), and the APT 212 may create one or more files such as data files or the like while executing. An advanced persistent threat should be understood to generally include all such files and processes except where a specific file or process is more specifically noted.

The APT 212 may be analyzed by one or more threat countermeasures on the endpoint 202 such as a whitelisting filter 214 that approves each item of code before executing on the endpoint 202 and prevents execution of non-whitelisted code. The endpoint 202 may also include an antivirus engine 216 or other malware detection software that uses any of a variety of techniques to identify malicious code by reputation or other characteristics. A runtime detection engine 218 may also monitor executing code to identify possible threats. More generally, any of a variety of threat detection techniques may be applied to the APT 212 before and during execution. An APT may evade these and other security measures and begin executing as a process 220 on the endpoint 202.

Network traffic 222 from the process 220 may be monitored and logged by a traffic monitor 224 on the endpoint 202, that logs, e.g., a time and a source of each network request from the endpoint 202. Where the endpoint 202 is within an enterprise network, the network traffic 222 may pass through the gateway 204 in transit to a data network such as the Internet. While the gateway 204 may be logically or physically positioned between the endpoint 202 and an external data network, it will be understood that other configurations are possible. For example, where the endpoint 202 is associated with an enterprise network but operating remotely, the endpoint 202 may form a VPN or other secure tunnel or the like to the gateway 204 for use of a threat management system 206, enterprise management system 208, and any other enterprise resources.

The endpoint 202 may use a heartbeat 226 to periodically and securely communicate status to the gateway 204. The heartbeat 226 may be created by a health monitor 228 within the endpoint 202, and may be transmitted to a remote health monitor 230 at the gateway 204. The health monitor 228 may monitor system health in a variety of ways, such as by checking the status of individual software items executing on the endpoint 202, checking that antivirus and other security software is up to date (e.g., with current virus definition files and so forth) and running correctly, checking the integrity of cryptographic key stores, and checking any other hardware or software components of the endpoint 202 as necessary or helpful for health monitoring. The health monitor 228 may thus condition the issuance of a heartbeat 226 on a satisfactory status of the endpoint 202 according to any suitable criteria and evaluation techniques.

The heartbeat 226 may be secured in any suitable manner such that the health monitor 230 knows that the messages are coming directly from the heartbeat 226 and that the heartbeat 226 is running in the correct manner and with integrity. To this end, the heartbeat 226 may sign its messages, where the public aspect of the signing key pair is known to the health monitor 230, either directly by the key or some other aspect—e.g., through marking a public key, either by certificate, or direct signing, or direct recoding the public key or the fingerprint of the public key, or any other standard PKI method for noting a public key. In this manner, the heartbeat 226 may have access and can sign its messages to the heartbeat monitor 230.

In one aspect, a key vault 232 may be provided on the endpoint to support cryptographic functions associated with a secure heartbeat. An obfuscated key vault 232 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 232, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

A robust heartbeat 226 may usefully provide defensive mechanisms against reverse engineering of obfuscated content (e.g., the private key material stored in key vault 232, the code used to validate the correct running of the remainder of the systems as part of the heartbeat 226 code itself— i.e., protecting against any changes to that code) and any anti-lifting protections to prevent malware from directly using the endpoint 202 (or the health monitor 228 on the endpoint 202) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 226 code itself.

A variety of useful techniques may be employed to improve security of the key vault 232 and the heartbeat 226. For example, the system may use domain shifting so that original key material is inferred based on hardware and software properties readily available to the key vault 232, and to ensure that key material uses non-standard algorithms. Software properties may, for example, include readily determined system values such as hashes of nearby code. In another aspect, the keys may be domain shifted in a manner unique to the endpoint 202 so that the manner of statistical validation of call stacks and core software is unique to the endpoint 202. Further the key vault may be provisioned so that a public key stored in the key vault 232 is signed with a certificate (or into a certificate chain) that can be externally validated by a network appliance or other trusted third party or directly by the health monitor.

The heartbeat 226 may encode any useful status information, and may be transmitted from the endpoint 202 on any desired schedule including any periodic, aperiodic, random, deterministic, or other schedule. Configured in this manner, the heartbeat 226 can provide secure, tamper-resistant instrumentation for status of the endpoint 202, and in particular an indication that the endpoint 202 is online and uncompromised. A disappearance of the heartbeat 226 from the endpoint 202 may indicate that the endpoint 202 has been compromised; however this may also simply indicate that the endpoint 202 has been powered off or intentionally disconnected from the network. Thus, other criteria may be used in addition to the disappearance or interruption of the heartbeat 226 to more accurately detect malicious software. Some such techniques are described below, but it will be understood that this may include any supplemental information that might tend to make an attack on the endpoint 202 more or less likely. For example, if the heartbeat 226 is interrupted but the endpoint 202 is still sourcing network traffic, then an inference might suitably be made that the endpoint 202 is compromised.

Details of various processes that can be deployed on the system 200 are provided below. In general, the system uses a gateway 204 between the endpoint 202 and a data network such as the Internet. The threat management system 206 and enterprise management system 208 may be any of the threat management systems or components described with reference to FIG. 1. As generally illustrated, the threat management system 206 is intended to be an external resource for identification of code, files, processes, URI's and so forth that are known to be malicious. The threat management system 206 may thus catalog known malicious content of various forms, and may provide an interface for determining whether a particular file or process is known to be malicious. The threat management system 206 may also provide numerous related functions such as an interface for receiving information on new, unknown files or processes, and for testing of such code or content in a sandbox on the threat management system 206. While depicted as a separate, independent resource, it will be understood that the threat management system 206 may be integrated into the enterprise management system 208 for use in managing the enterprise for the endpoints 202, 210, or otherwise deployed within the enterprise or at a remotely accessible location.

The enterprise management system 208 generally provides tools and interfaces for administration of the enterprise and various endpoints 210 and other resources or assets attached thereto. It will be understood that, the functions of the threat management system 206 and the enterprise management system 208 may vary, and general threat management and administration functions may be distributed in a variety of ways between and among these and other components. This is generally indicated in FIG. 2 as a threat management facility 250 that includes the threat management system 206 and the enterprise management system 208. It will be understood that either or both of these system may be administered by third parties on behalf of the enterprise, or managed completely within the enterprise, or some combination of these, all without departing from the scope of this disclosure. It will similarly be understood that a reference herein to a threat management facility 250 is not intended to imply any particular combination of functions or components, and shall only be understood to include such functions or components as explicitly stated in a particular context, or as necessary to provide countermeasures for advanced persistent threats as contemplated herein. Having described the entities in a threat management system 200, a number of specific processes for managing threats such as advanced persistent threats are now described in greater detail.

Figure 3:
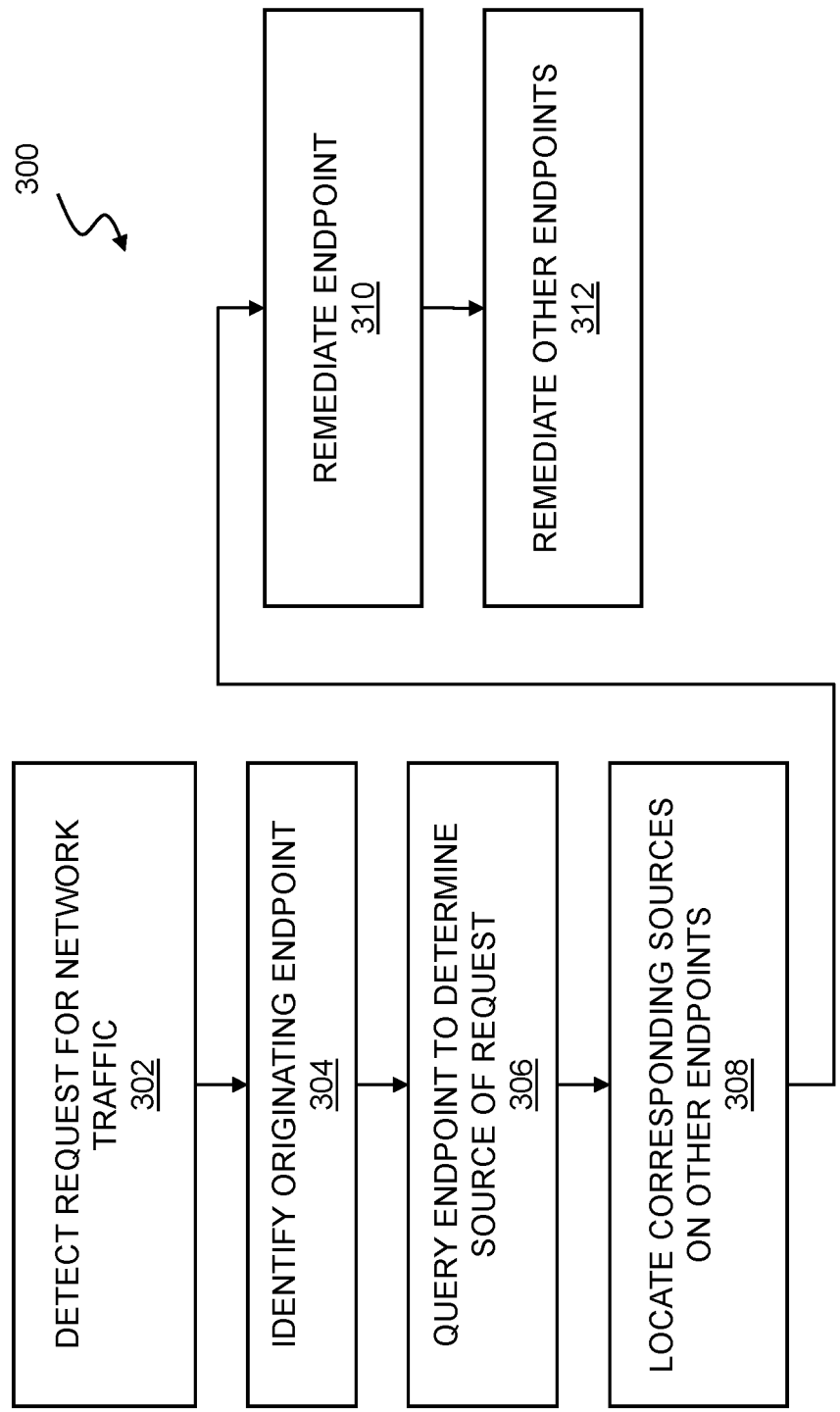
FIG. 3 is a flowchart of a method for advanced persistent threat detection.

FIG. 3 is a flowchart of a method for advanced persistent threat detection.

As shown in step 302, the method 300 may begin with detecting a request for network traffic. The request may, for example, be detected at a gateway associated with an enterprise managed by a threat management facility such as any of the gateways described herein. The request may include a destination address such as a URI or other network address or the like identifying a network-accessible resource.

The request may also contain a violation of a network policy for the enterprise. The violation may be detected in a variety of ways. For example, the violation may be detected at the gateway. In another aspect, information about the request (e.g., a URI) may be sent to a remote resource such as the threat management facility described above for evaluation using any number and type of rules currently available. In particular with respect to APTs, the request may be analyzed for APT command and control protocol information, or the use of a URI known to be associated with APT command and control. Thus for example, the violation may include a prohibited Uniform Resource Identifier in the destination of the request, or a prohibited domain or other address information similarly directed to a prohibited network resource such as a command and control location for an APT. In another aspect, the violation may include prohibited content in the request such as command and control protocol traffic for an advanced persistent threat. More generally, any local or remote resource(s) may be used to perform the identification, and any suitable criteria, characteristics, or the like may be used to obtain the identification of a violation. A global resource may be usefully employed to share information about APTs and the like across any number of enterprises and other networks and network assets.

As shown in step 304, the method 300 may include identifying an endpoint coupled to the gateway that originated the request. While a network request will generally include a source address such as a MAC address and an IP address that identify a source of the request, traffic originating from malicious code may omit, spoof, obscure, or otherwise manipulate this source address information in order to avoid detection. In the event that the endpoint cannot be identified from the request alone, the gateway may, for example, use information from a secure heartbeat or the like to recover a machine ID of the endpoint that originated the request. Thus in one aspect, identifying the endpoint may include determining a machine ID for the endpoint based upon a secure heartbeat received at the gateway from the endpoint.

As noted above, malicious code may try to obfuscate a source of network communications. The secure heartbeat may be used in a variety of ways to mitigate this obfuscation and assist in accurate identification of a machine on the enterprise network. For example the heartbeat may relay a local MAC and IP address, as well as a machine ID for the endpoint so that a gateway can match these attributes to one another. In another aspect, the gateway may use port information along with machine ID information in the secure heartbeat to identify specific machines coupled to a port of the gateway. While a number of machines may be coupled to a single port, the gateway can at least determine this subset of machines using heartbeat information, and then query these specific machines for additional information after potentially harmful traffic is identified. The heartbeat might also or instead contain additional identifying information that it signs into its messages to the health monitor including measurements of the overall systems, recorded or observed version and currency of the latest updates, and other measurements, direct and indirect of the systems health.

In another aspect, an endpoint may encapsulate all packetized communications to the gateway with a machine ID, which may be secured or unsecured, and the gateway may remove this encapsulation before forwarding traffic from the endpoint so that the encapsulation is only used for traffic on the enterprise side of the gateway. The presence of the encapsulation, either as a form of heartbeat (e.g., with encryption) or in combination with the secure heartbeat, may be used to verify a properly functioning endpoint and to affirmatively identify a specific machine as a source of network traffic.

As shown in step 306, the method 300 may include querying the endpoint to determine a source of the request. In particular, as noted above network traffic from an endpoint may be monitored. When the correct machine has been identified, the network monitoring system on that endpoint may be queried based upon the time and destination (which generally cannot be obscured for a successful network request) to identify a source of the request on the endpoint. In this context, the term "source" is intended to refer to code and/or data files on the endpoint responsible for initiating the request. Thus, for example, the source on the endpoint may include a file, a process, a data source, or some combination of these. Querying the endpoint may include accessing a log maintained at the endpoint that stores information about outbound network requests from processes executing on the endpoint, such as a log maintained by the traffic monitor described above. Accessing the log may, e.g., include searching the log for entries corresponding to the time and the destination of the request.

As shown in step 308, the method 300 may include locating a corresponding source on one or more other endpoints managed by the threat management facility. As noted above, each endpoint may explicitly whitelist code prior to execution. Thus each endpoint maintains a list of executing processes and related information. This may include files and data related to the executing processes so that the runtime detection engine 218 or similar component can map processes back to files, which may be useful, for example, in identifying and blocking non-executing APTs on other endpoints. For executing processes, an administrator using a threat management facility or the like may query the whitelisting agent on each endpoint coupled to the threat management facility in order to identify any endpoints that are compromised in the same manner as the endpoint. The threat management facility may also update any signatures, profiles, rules, or the like for subsequent detection of the APT; however, locating specific endpoints permits more rapid and focused remediation.

As shown in step 310, the method 300 may include remediating the endpoint that was originally identified with the source, such as with any of the remediation techniques described herein.

As shown in step 312, the method 300 may include remediating the one or more other endpoints identified by the threat management facility based on whitelisting information or the like. Remediation may include any of a wide range of well known techniques. For example, this may include quarantining any affected endpoints, or specifically quarantining the source of the APT on each of the one or more other endpoints. Remediating may also or instead include removing the source from the affected endpoints. Remediating may also or instead include blocking network traffic for the affected endpoints (except for traffic to/from the threat management facility or other administrative contact point). Remediation may also or instead include blocking access by the affected endpoints to the destination address associated with the APT. This may impair or prevent further malicious activity from a remote command and control location.

Figure 4:
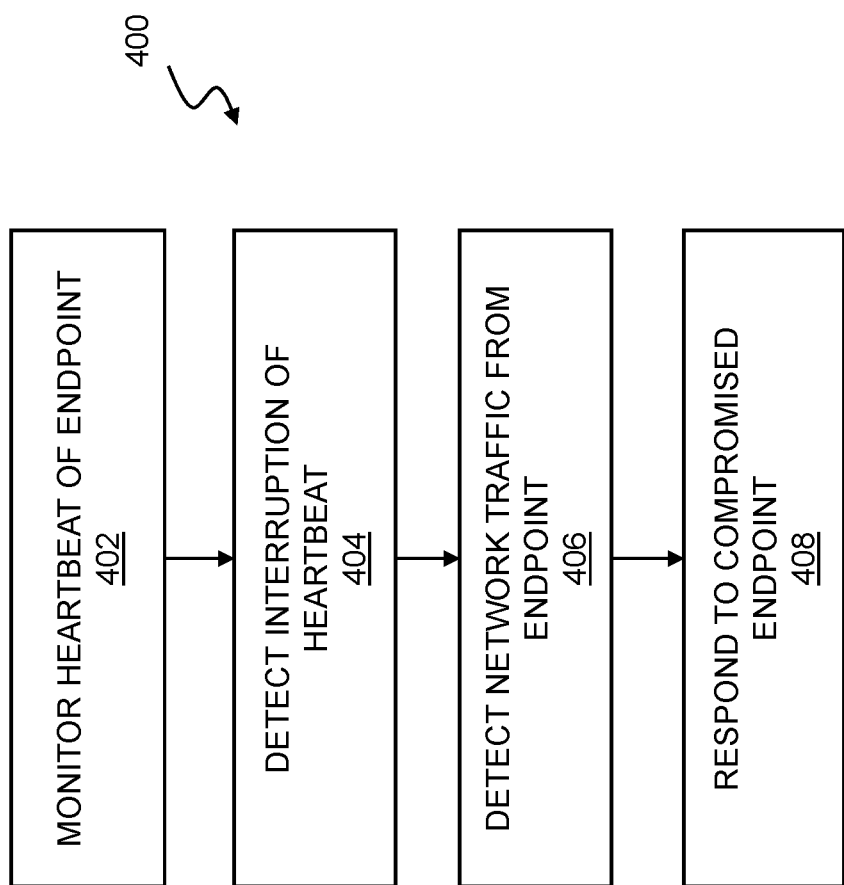
FIG. 4 is a flowchart of a method for intrusion detection using a heartbeat.

FIG. 4 is a flowchart of a method for intrusion detection using a heartbeat. The method 400 may in general be implemented on a gateway or any other suitable network element(s) in an enterprise network. This method 400 may be used alone or in combination with other techniques described herein for detecting and addressing advanced persistent threats.

As shown in step 402, the method 400 may include monitoring a heartbeat of an endpoint at the gateway. The heartbeat may include a periodic signal from the endpoint to the gateway to indicate a status of the endpoint. The heartbeat may communicate to the gateway various information indicating the direct and indirect observed health of the endpoint as well as various information uniquely identifying the endpoint. The heartbeat may be a heartbeat as generally described herein, and may include a secure heartbeat such as a cryptographically secured heartbeat using any of a variety of cryptographic techniques to secure contents of the heartbeat against tampering and to provide for authentication of the heartbeat or the source thereof. The heartbeat may, for example be encrypted and/or signed by the endpoint, or it may use its own internal key value, or it may be hardened by specific hardware or any other mechanisms to improve its robustness against adversarial code on the endpoint, and may include at least one item unique to the endpoint to facilitate authentication. The heartbeat may transmit signed packets to provide validation of the authenticity of the heartbeat packets.

As shown in step 404, the method 400 may include detecting an interruption of the heartbeat. In general, the heartbeat may follow some predetermined schedule, and any interruption of that predetermined schedule may be detected, e.g., by a gateway used by the endpoint. The interruption may, for example, include an omission of the periodic signal when the periodic signal is expected according to the predetermined schedule. In another aspect, the interruption may include an authentication failure in the periodic signal such as from an authentication attempt using a public key for the originating endpoint. In one aspect, information directly or indirectly indicating the health of the endpoint is included in the heartbeat; such data may be either directly or indirectly used to determine whether the endpoint is compromised. An improperly signed or malformed packet may be interpreted as an interruption. Also, any error with the packet, including the order of transmission or inappropriate retransmission of a packet, may be interpreted as an interruption. Similarly, any error, either cryptographic or in cleartext of the heartbeat, may be interpreted as an interruption. Such errors may include without limitation improperly signed or formatted packets, packets that have been repeated, packets that have been corrupted, or any other observable deviation either directly observable from a single packet or indirectly and/or statistically observable from the packet stream using data analytic techniques. Such observations could be made directly by the health monitor or in the aggregate by another component observing multiple health monitors, either directly or by using data analytic techniques. Similarly, an interruption may include a predetermined interval without the periodic signal, which may be a fixed interval, or an interval that varies according to, e.g., related network activity, time of day, or any other suitable scheduling criteria.

As shown in step 406, the method 400 may include detecting network traffic from the endpoint after the interruption. This may also or instead include detecting network traffic from the endpoint before, during, and/or after the interruption. In general, a heartbeat for an endpoint may be interrupted for any of a variety of reasons unrelated to malicious activity. For example, the endpoint may be powered down or enter a sleep or hibernation mode during which network communications are suspended. Similarly, the endpoint may be disconnected from the network for transportation or storage. Thus, the simple absence of a heartbeat from an endpoint does not necessarily offer a strong inference of malicious activity. However, if the heartbeat is suspended and the endpoint is still sourcing network traffic, then a strong inference may be made that the endpoint is compromised. While this is true for any network activity originating from the endpoint, a particularly strong inference may arise where the network traffic is also itself suspicious for some reason. Thus the network traffic may include suspicious network traffic, in which case a higher priority remediation may be indicated.

As shown in step 408, the method may include responding to a combination of the interruption and the network traffic by treating the endpoint as a compromised network asset. This may include any suitable form of remediation including without limitation any of the types of remediation described herein. For example, treating the endpoint as a compromised network asset may include quarantining the endpoint. Treating the endpoint as a compromised network asset may also or instead include blocking network access for the endpoint, or any other suitable remedial measures.

Figure 5:
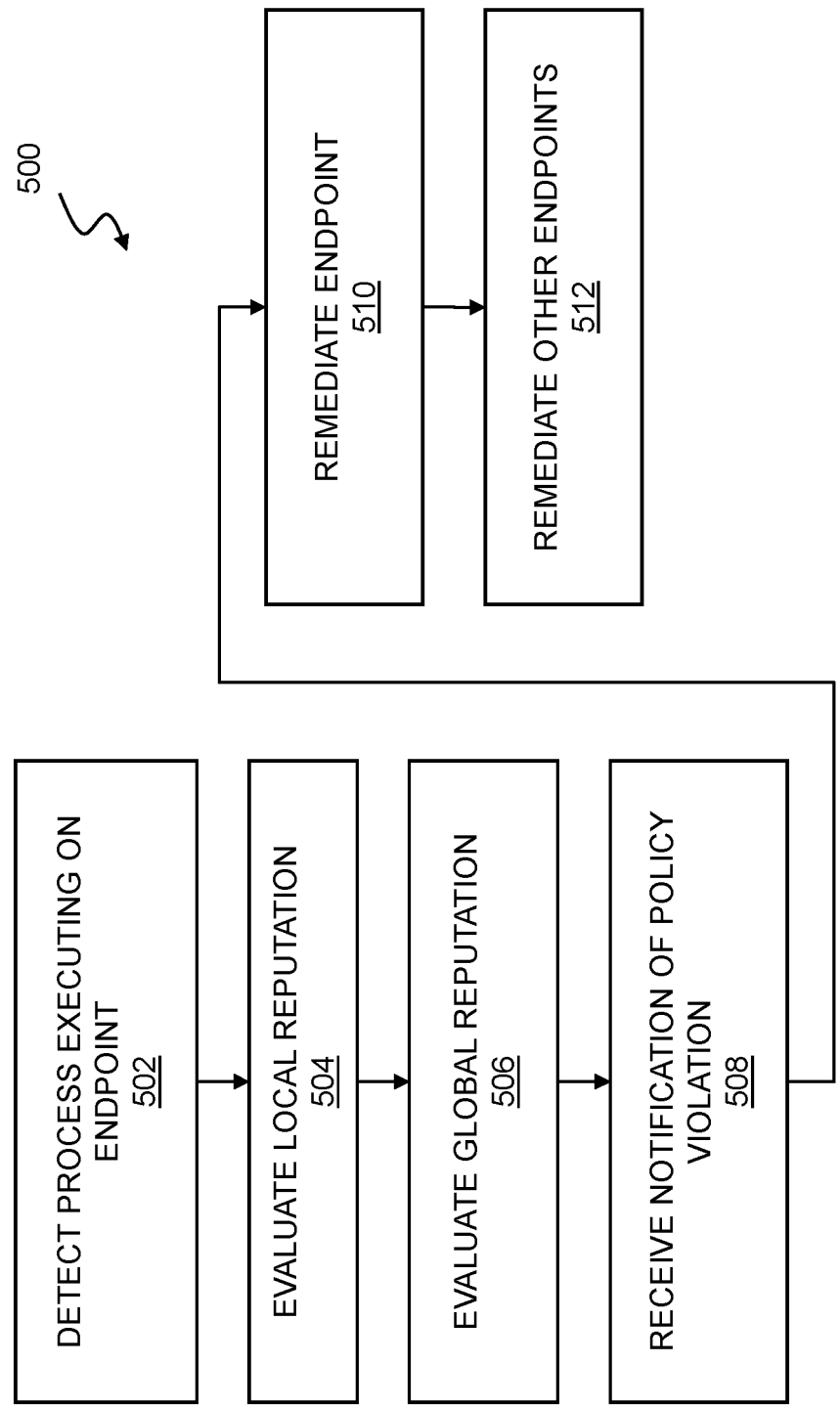
FIG. 5 is a flowchart of a method for using reputation to avoid false malware detections.

FIG. 5 is a flowchart of a method for using reputation to avoid false malware detections. While analysis of network traffic is known as a technique for detecting APTs and other malware, network communications may involve frequent and varied network requests that can lead to numerous false positives during periods of high network usage. In order to avoid inappropriate remedial actions and corresponding drains on network resources and local processing resources, reputation is used to improve the accuracy of network-based malware detections and avoid excessive false positives. This method 500 may be used alone or in combination with other techniques described herein for detecting and addressing advanced persistent threats.

As shown in step 502, the method 500 may include detecting a process executing from a file on the endpoint. This may include detection using any of the techniques described herein, or any other suitable techniques. By way of non-limiting examples, this may include detection through a whitelisting agent on the endpoint, or detection of network activity through a network monitor.

As shown in step 504, the method 500 may include evaluating a local reputation of the file at the endpoint using one or more local criteria on the endpoint. The local reputation may be evaluated using any suitable rules, local criteria, and the like. For example, evaluating a local reputation may include using locally available attributes applied by a local whitelisting system. Evaluating a local reputation may also or instead include locally evaluating a source of the file such as one or more of a user associated with the process, a certificate associated with a source of the file, a certificate associated with an installer for the file, a logical location of a source of the file, and a physical location of a source of the file. Evaluating the local reputation may also or instead include evaluating a reputation of an environment including the endpoint. More generally, any context, location, or other locally available information relating to where a file comes from, what application launches or uses a file, what user is executing a process or thread, and so forth, may be usefully applied to evaluate a local reputation of the file (or a corresponding process) based on locally available information and/or location information.

In one aspect, evaluating the local reputation may include evaluating a reputation of a data file used by the process. During execution, a process may open one or more other data files for manipulating data. This may include preexisting data files on a machine or accessible through a network. This may also or instead include temporary data files created by the process for use during execution. Regardless of how created or used, such data files may also provide valuable indicators of reputation. As such, evaluating the reputation of a data file may include one or more of evaluating a reputation of an origin of the data file, evaluating a reputation of an environment for the data file, evaluating a reputation of a user that created the data file, and evaluating a reputation of the process that is using the data file. So for example, a web browser may, in general, be considered less reliable than other applications that might be executing on an endpoint, and a data file opened by a web browser plug-in may be particularly suspect. This type of context (the application, the user, etc.) may be particularly helpful in locally evaluating reputation.

As shown in step 506, the method 500 may include evaluating a global reputation of the file by requesting an evaluation of the file or the process from a remote threat management facility. This may, for example, include the threat management system described herein, or any other suitable remote resource. The remote resource may in general apply any type of identification techniques based on the name of the file, signature information, behavior, and so forth. More generally, global reputation may include anything known globally about a particular file based on the prevalence, usage history, and so forth for the file, whereas local reputation may include any aspects of reputation that can be determined based on a source or context for the file (and generally without regard to any global reputation information that might be available for the file).

As shown in step 508, the method 500 may include receiving a notification from a gateway between the endpoint and a data network that network traffic from the endpoint includes a violation of a network policy for the endpoint. That is, independent of reputation information, potentially harmful network traffic may be flagged at a gateway based upon the violation of the network policy. The violation may include a prohibited Uniform Resource Identifier in the destination, a prohibited domain in the destination, prohibited content in the network request, and so forth. With respect to APTs in particular, the prohibited information may include a command and control location for an advanced persistent threat in the destination, command and control protocol traffic for an APT, or any other evidence of an APT on the endpoint that might be identified based on network traffic.

As shown in step 510, the method 500 may include responding to the notification by conditionally treating the endpoint as a compromised network asset only when the local reputation is low and the global reputation is low or unknown. It will be appreciated that a variety of quantitative and rule-based techniques may be employed to apply this multi-factored analysis. In general, any technique for weighting these three inputs—local reputation, global reputation, and policy violation—and reaching an actionable conclusion on a potential threat may be suitably adapted for use in the method 500 contemplated herein. Any thresholds, ranges of values, or other metrics for this determination may be established and managed as aspects of the enterprise policy. This analysis may also use historical data. For example, a potentially harmful network interaction may be viewed differently (and more likely malicious) if there was recently the presence or execution of low reputation files or data on an endpoint.

Once a conclusion has been reached that remedial action is appropriate, any of a variety of remedial measures may be taken as generally described herein. For example, treating the endpoint as a compromised network asset may include quarantining the endpoint. Treating the endpoint as a compromised network asset may also or instead include blocking network access for the network. As another example, this may include blocking any use of low-reputation files on an endpoint.

As shown in step 512, the method may include locating one or more other endpoints containing the file or the process that resulted in the violation and remediating the additional endpoints. Remediation may be through any suitable techniques such as quarantining the one or more other endpoints, removing the file or the process from the one or more other endpoints, blocking network traffic for the one or more other endpoints, or any of the other remediation techniques described herein.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
    receiving, at a gateway, a heartbeat from a network asset, wherein
        the gateway is interposed between an enterprise network and an external network,
        the network asset is executing on a cloud computing facility associated with the enterprise network,
        the heartbeat is addressed to the gateway,
        the heartbeat encodes a security health status of the network asset based on monitoring, with a local security agent, of software items executing on the network asset, and
        the security health status of the heartbeat indicates an uncompromised security health status when no compromise of the network asset is detected by the local security agent;
    detecting a change in the security health status included in the heartbeat at the gateway;
    following detecting the change of the security health status included in the heartbeat received at the gateway, receiving, at the gateway, network traffic other than the heartbeat from the network asset, the network traffic addressed for forwarding by the gateway via the external network to a destination address outside the gateway from the enterprise network; and
    responding to the change of the security health status included in the heartbeat, in combination with the network traffic received following the change, by initiating a remediation of the enterprise network.

2. The method of claim 1, wherein the heartbeat includes one or more of a local Media Access Control (MAC) address for the network asset, an Internet Protocol (IP) address for the network asset, and a machine identifier (ID) for the network asset.

3. The method of claim 1, wherein the heartbeat includes at least one item unique to the network asset.

4. The method of claim 1, wherein initiating the remediation includes blocking, by the gateway, the network traffic other than the heartbeat from the network asset.

5. The method of claim 1, wherein initiating the remediation includes initiating a scan of the network asset for malware.

6. The method of claim 1, wherein initiating the remediation includes quarantining the network asset.

7. The method of claim 1, wherein the heartbeat is cryptographically signed.

8. The method of claim 1, wherein the security health status is further based on an integrity of a cryptographic key store on the network asset.

9. The method of claim 1, wherein the security health status is further based on a virus definition file stored on the network asset.

10. The method of claim 1, wherein the network traffic includes suspicious network traffic.

11. A computer program product comprising a non-transitory computer readable medium having stored thereon computer executable code that, when executing on one or more computing devices, cause the one or more computing devices to perform the steps of:
    receiving, at a gateway, a heartbeat from a network asset, wherein
        the gateway is interposed between an enterprise network and an external network,
        the network asset is executing on a cloud computing facility associated with the enterprise network,
        the heartbeat is addressed to the gateway,
        the heartbeat encodes a security health status of the network asset based on monitoring, with a local security agent, of software items executing on the network asset, and
        the security health status of the heartbeat indicates an uncompromised security health status when no compromise of the network asset is detected by the local security agent;
    detecting a change in the security health status included in the heartbeat at the gateway;
    following detecting the change of the security health status included in the heartbeat received at the gateway, receiving, at the gateway, network traffic other than the heartbeat from the network asset, the network traffic addressed for forwarding by the gateway via the external network to a destination address outside the gateway from the enterprise network; and
    responding to the change of the security health status included in the heartbeat, in combination with the network traffic received following the change, by initiating a remediation of the enterprise network.

12. The computer program product of claim 11, wherein the heartbeat includes one or more of a local MAC address for the network asset, an IP address for the network asset, and a machine ID for the network asset.

13. The computer program product of claim 11, wherein initiating the remediation includes blocking, by the gateway, the network traffic other than the heartbeat from the network asset.

14. The computer program product of claim 11, wherein initiating the remediation includes initiating a scan of the network asset for malware.

15. The computer program product of claim 11, wherein the one or more computing devices include a threat management facility for the enterprise network.

16. The computer program product of claim 11, wherein the one or more computing devices include the gateway.

17. A system comprising:
    a network asset in a first network, the network asset including a first memory, the network asset configured to monitor software items executing on the network asset and to create a heartbeat including:

information uniquely identifying the network asset, and a security health status of the network asset,
wherein the security health status is based on one or more software items executing on the network asset, and wherein the security health status indicates an uncompromised security health status when the network asset is uncompromised; and
a gateway interposed between the network asset in the first network and a second network, wherein
the gateway is in communication with the network asset over the first network, and
the network asset is in communication with the second network via the gateway, and the gateway is configured by computer executable code stored in a second memory to perform the steps of:
receiving the heartbeat from the network asset,
receiving and forwarding network traffic other than the heartbeat from the network asset to a destination address in the second network,
detecting a change in the security health status included in the heartbeat, and
initiating a remedial action directed to the network asset based on a combination of the change of the security health status included in the heartbeat and detection of network traffic, other than the heartbeat, following detection of the change of the security health status.

18. The system of claim 17, wherein the remedial action includes blocking the network traffic from the network asset to the second network.

19. The system of claim 17, wherein the information uniquely identifying the network asset includes at least one of a local MAC address for the network asset, an IP address for the network asset, and a machine ID for the network asset.

20. The system of claim 17, wherein the security health status is based on at least one of an integrity of a cryptographic key store on the network asset and a virus definition file stored on the network asset.

* * * * *